(12) United States Patent
Ottamalika et al.

(10) Patent No.: US 7,898,963 B2
(45) Date of Patent: Mar. 1, 2011

(54) GRAPHICAL REPRESENTATION OF THE FLOW OF A PACKET THROUGH A NETWORK DEVICE

(75) Inventors: Iqlas Maheen Ottamalika, San Jose, CA (US); Steven Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 701 days.

(21) Appl. No.: 11/370,295

(22) Filed: Mar. 7, 2006

(65) Prior Publication Data
US 2007/0211644 A1 Sep. 13, 2007

(51) Int. Cl.
*H04L 12/28* (2006.01)
*G06F 15/16* (2006.01)
*H04L 29/06* (2006.01)

(52) U.S. Cl. .................... 370/241; 370/241.1; 713/154; 726/13

(58) Field of Classification Search ......... 370/465–473, 370/241–253, 216–228; 709/230–244, 201–203, 709/223–226; 345/440, 520, 522, 530–538; 717/123, 124; 703/21, 22; 713/150, 154, 713/160, 201; 715/209, 210, 700, 719, 735–743; 726/1–3, 6, 7, 11–13, 26–30
See application file for complete search history.

(56) References Cited

U.S. PATENT DOCUMENTS

| | | | | |
|---|---|---|---|---|
| 6,892,309 | B2* | 5/2005 | Richmond et al. | 726/7 |
| 7,075,557 | B2* | 7/2006 | Ludtke et al. | 345/629 |
| 2004/0088571 | A1* | 5/2004 | Jerrim et al. | 713/201 |
| 2005/0288917 | A1* | 12/2005 | Hooper et al. | 703/21 |
| 2005/0289514 | A1* | 12/2005 | Hooper et al. | 717/124 |
| 2006/0159019 | A1* | 7/2006 | Buskirk et al. | 370/235 |
| 2007/0208854 | A1* | 9/2007 | Wiryaman et al. | 709/225 |

* cited by examiner

*Primary Examiner*—Aung S Moe
*Assistant Examiner*—Prince Mensah
(74) *Attorney, Agent, or Firm*—Stolowitz Ford Cowger LLP

(57) ABSTRACT

A method for graphically displaying a packet progression within a network device is described. The method includes identifying a plurality of phases that correspond to an operation of a plurality of operations performed on said packet. The method further includes displaying the plurality of phases. The method further includes indicating progression of the packet through the plurality of phases.

22 Claims, 4 Drawing Sheets ical Representation of the Flow of a Packet Through a Network Device

FIELD OF THE INVENTION

The present invention relates broadly to network devices. More specifically, embodiments of the present invention relate to graphically displaying the progression of a packet within a network device.

BACKGROUND

For a variety of reasons, a packet en route to its destination often passes through one or more networking device(s). For example, for security purposes, a packet may pass through various network devices, such as a firewall, a router, and an Intrusion Prevention System (IPS). Once a networking device has received the packet it may perform a series of complex operations on the packet before the packet is allowed to be transmitted or is dropped. For example, a firewall that has received a packet may perform a series of operations on the packet to determine whether the packet is valid and safe before transmitting it out the egress (output) interface.

With conventional approaches, a user may know that a packet has arrived in the ingress interface of a network device, but the user has no efficient way of determining the various operations performed on the packet within a network device. For example, with conventional approaches, a user may need to go through what could possibly be hundreds of logging messages to try to understand the various operations performed on a packet within a network device. In addition, in a typical network device, the conditions and rules that have been configured are generally numerous and complex, which means that the reason for dropping a packet in a network device may be elusive for a user on a time constraint and without full understanding of the device, or intimate knowledge of the protocols utilized.

For example, a traditional approach in analyzing the operations performed on the packet is by examining associated logs (syslogs) and debugs. However, a limitation of current logs and debugs is that the current logs and debugs do not apply to a single packet, but instead apply to an entire feature or protocol. As of result, trying to determine the operations performed on an individual packet by examining associated logs and/or debugs requires correlation of the logs/debugs back to the specific packet. This is very time consuming and inefficient.

DETAILED DESCRIPTION

Figure 1A:
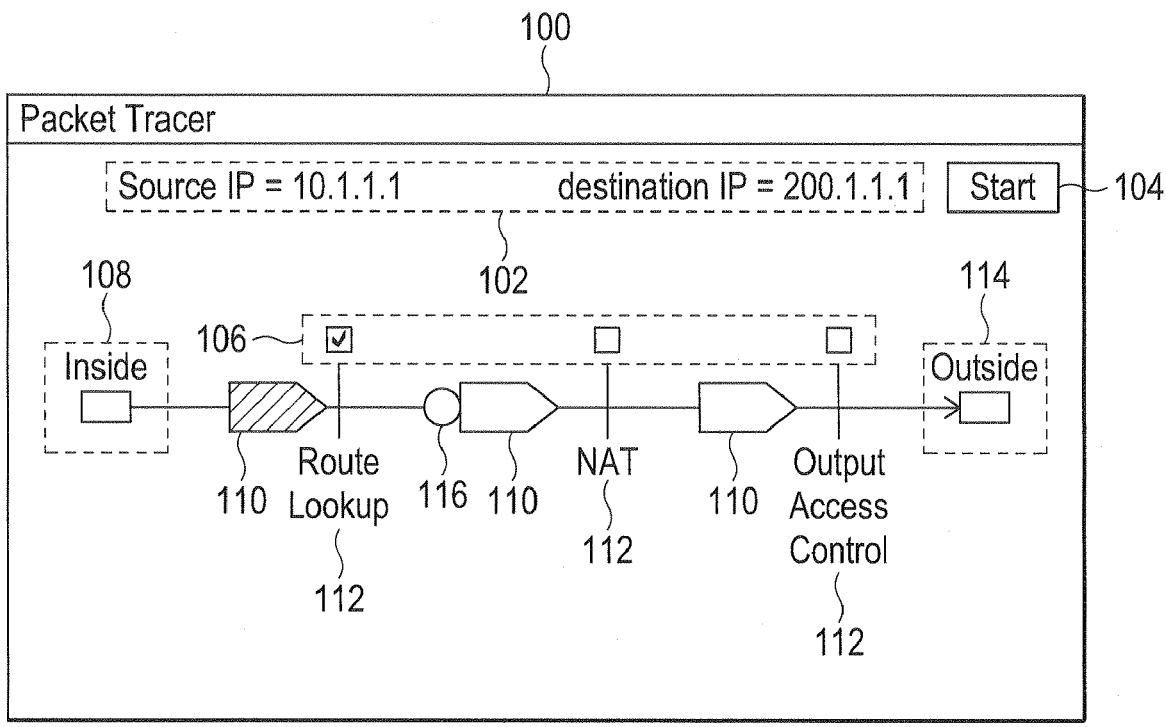
FIG. 1A illustrates a block diagram of an exemplary interface used in accordance with an embodiment of the present invention.

Graphical displays of packet progressions within network devices are described. Reference will now be made in detail to embodiments, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

In overview, embodiments pertain to graphically displaying a packet progression within a network device. A packet progression (also referred to as packet movement) is divided into a series of phases such as, but not limited to, routing phase, input access control phase, network address translation phase, authentication phase, advance protocol filtering phase, application layer inspection phase, encryption phase, rate limiting phase, classification phase, virtual private network rules phase, and output access control phase. Each of the phases corresponds to an operation performed on the packet. An operation (also referred to as a procedure) may be either an action or a decision identifying a phase of a packet progression within a network device. For example, an action could be a modification of a packet, while a decision could refer to a decision made to not modify a packet, or a decision made to allow, or to deny a packet's progression.

Additionally, along with the graphic display of the phases, the end result of the phase and the configured rules (also referred to as rules) which correspond to the phases may also be communicated to a user. A corresponding rule to a phase is a rule that resulted in a particular operation performed on a packet, which identifies a phase of a packet progression. For example, a packet may be dropped internally during a phase due to a configured rule, or a packet may pass through all the phases and reach an egress interface due to various configured rules which have allowed the packet to pass the different phases.

In some instances, embodiments include graphic interfaces that display one or more phase(s) of the designated packet(s) both visually and with dynamic linking (e.g., a button) to its corresponding rule(s). Furthermore, embodiments of the graphic display of the phases may be animated. In such instances, not only is the graphic display able to communicate to a user the operations performed and/or decisions made on a packet by a network device as a series of phases, the display may also illustrate through animation the phases of the packet life and the end results each individual phase has had on the packet.

In addition, in one embodiment, not only is the graphic display of the phases animated, but the display allows a user to acquire additional information on one or more phases of a packet progression by selecting one or more of the visually displayed phases directly (e.g., dynamic linking of the visually displayed phases with their corresponding details. Moreover, in another embodiment, the graphical display of a packet progression includes a component capable of receiving one or more input from a user for initiating one or more actions associated with said packet progression. For example, a user may select a button which will automatically create a second rule opposite of the original rule (also referred to as first rule) so that a packet which was denied in a particular phase may be allowed, or that a packet with was allowed/permitted will be denied that a particular phase.

Figure 1B:
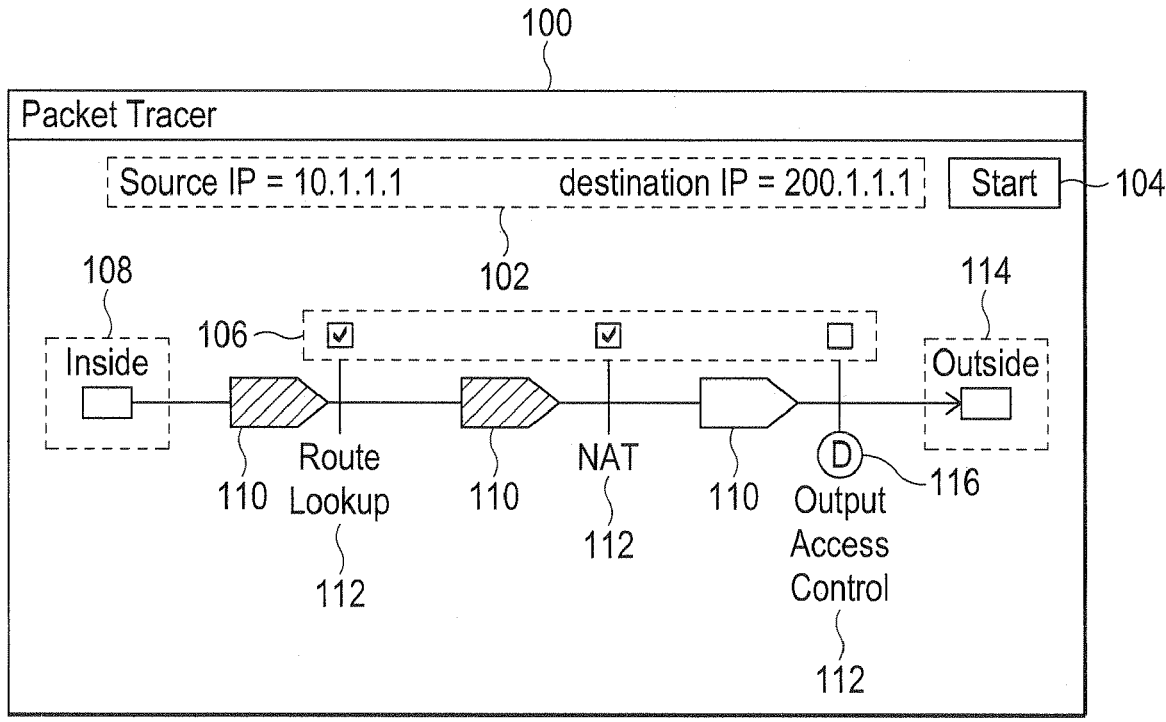
FIG. 1B illustrates a block diagram of an exemplary interface used in accordance with an embodiment of the present invention.

FIGS. 1A and 1B are block diagrams of an exemplary interface 100 upon which embodiments may be implemented. The interface 100 graphically shows a packet progression through a network device. In this example, exemplary interface 100 is illustrated as Packet Tracer 100, which is an exemplary graphical packet progression display. As depicted in FIGS. 1A and 1B, the Packet Tracer 100 includes two key attributes 102 of the packet selected in this illustration, a start button 104, phase check off icons 106, inside network device icon 108, graphical phase icons 110, phase names 112, outside network device icon 114, and packet progression indicator 116. Although exemplary interface 100 is shown and described as having certain numbers and types of elements, the present embodiment is not so limited; that is exemplary interface 100 may include elements other than those shown. In addition, in another embodiment, exemplary interface 100 does not include all of the numbers and types of elements shown in FIGS. 1A and 1B.

In reference to the present embodiment depicted by FIGS. 1A and 1B, the two key attributes 102 of the packet selected in this example shows the source Internet Protocol address and the destination Internet Protocol address. In another embodiment, there may be a different number of key attributes shown in the exemplary graphical packet progression interface. Key attribute may include information such as, but not limited to, ingress interface information, source Internet Protocol address, destination Internet Protocol address, protocol used, source port information, destination port information, and/or a hex dump of a packet.

Still in reference to the present embodiment depicted by FIGS. 1A and 1B, the start button 104 is a button of the interface, which may be selected to start the animated display of a designated packet's progression within a network device. Graphical phase icons 110 are icons depicting the individual phases of a packet's progression or movement within a network device. In the present embodiment, when a packet has passed a particular phase, that particular graphical phase icon identifying the phase becomes diagonally stripped in animation. Graphical phase icons may be represented in various ways in various embodiments. For example, in other instances, the graphical phase icons may each have different colors. In addition, other graphical phase icons may each have various shapes, and/or be animated differently from what is shown in FIGS. 1A and 1B. Moreover, as different packets may have different phases, different graphical phase icons may be illustrated in the graphical packet progression displays of the different packets.

Phase check off icons 106, of FIGS. 1A and 2B, are icons that graphically illustrate to a user whether a selected packet has passed a phase of progression. Phase names 112 identify, by name, the individual phases of a packet progression (e.g., Route lookup 112, NAT 112, and Output access control 112). Inside network device icon 108 represents the ingress interface of a network device, while outside network device icon 114 represents the egress interface of that network device. Finally, in the present embodiment, in an animation, packet progression indicator 116 is depicted in FIGS. 1A and 2B as an empty circle while passing through the phases and as a circle containing the capital letter "D" when the packet is dropped. One or more of the icons and/or elements described above may be depicted, in another embodiment, in a manner different from FIGS. 1A and 2B.

Referring now to FIG. 1A, in operation, this figure is described in context of an animated packet progression interface, in which a user has already designated a simulated packet by inputting the key attributes of a simulated packet (e.g. the two key attributes 102) and has already started the animation of the designated packet progression by selection of the start button 104. In the present embodiment, the packet progression indicator 116 is depicted as having passed the route lookup phase (e.g., Route lookup 112) and about to enter the network address translation phase (e.g., NAT 110). In the present embodiment, the graphical phase icon 110 to the left of Route lookup 112 is depicted as being diagonally stripped, while the other graphical phase icons are not diagonally stripped because the packet has passed the route lookup phase, but has yet to pass the other phases such as, the network address translation phase and the output access control phase. Similarly, for the same reason, only the phase check off icons 106 above the Route lookup phase name 112 is distinguished by a check mark symbol, while the other phase check off icons 106 above the NAT phase name 112 and the Output Access Control phase name 112 are not distinguished by a check mark symbol.

In FIG. 1B, in operation, this figure is described in context of the animated packet progression interface of FIG. 1A of a later time period than that of FIG. 1A. In the present embodiment, the animated packet progression interface depicts the packet progression indicator 116 as a circle containing the capital letter "D" above the Output access control phase name 112 because the designated packet depicted by the interface has been dropped during the Output access control phase of that packet's progression or movement within a network device. In another embodiment, when a packet is denied or dropped, a red "X" mark may be used to designate the phase at which the packet was denied or dropped. However, referring back to FIG. 1B, in the present embodiment, the designated packet has passed both the route lookup phase and the network address translation phase as signified by the diagonally stripped graphical phase icons 110 to the left of the Route lookup phase name 112 and NAT phase name 112 and by the phase check off icons distinguished with check mark symbols above the two phases.

Figure 2:
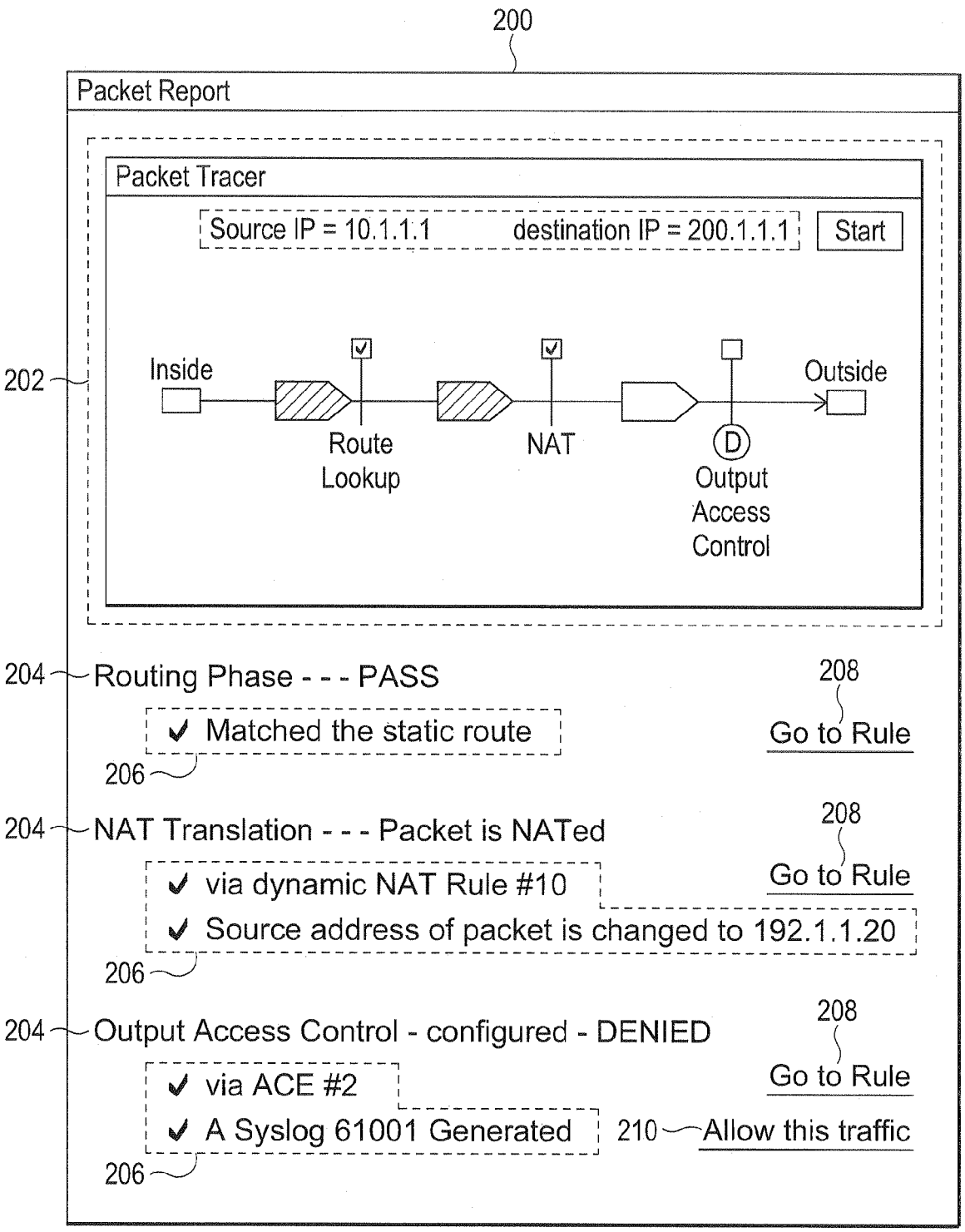
FIG. 2 is a block diagram of an exemplary interface used in accordance with an embodiment of the present invention.

FIG. 2 is a block diagram of an exemplary interface 200 upon which embodiments may be implemented. In present embodiment, the exemplary interface is referred to as Packet Report 200. In the present embodiment, Packet Report 200 is an interface which contains various details of individual phases of the designated packet of FIGS. 1A and 1B. Packet Report 200, in this embodiment, includes interface 202, which is an animated graphical representation of a packet progression within a network device (e.g., FIGS. 1A and 1B). In another embodiment, Packet Report 200 does not include interface 202. A packet report and a graphical packet progression interface may be displayed together or separately. A graphical packet progression interface (e.g., as depicted in FIGS. 1A and 1B) may also be displayed without a packet report and vice versa. Although exemplary interface 200 is shown and described as having certain numbers and types of elements, the present embodiment is not so limited; that is exemplary interface 200 may include elements other than those shown. In addition, in another embodiment, exemplary interface 200 does not include all of the numbers and types of elements shown in FIG. 2.

Still referring to FIG. 2, in present embodiment, Packet Report 200 also includes headers 204, details 206, Go to rule button 208, and Allow this traffic button 210. Headers 204 textually identify and separate the different phases of a packet progression within a network device (e.g., Routing phase, NAT translation phase, Output access control phase). In the present embodiment, following the headers 204 by three hyphens are quick textual summaries of the status of the packet within that particular phase. Quick textual summaries may include whether the packet has passed the particular phase, been modified, or denied. For example, in the present embodiment, under the NAT Translation header 204, the quick textual summary of the status of the designated packet indicates that the designated packet has been network address translated. In one embodiment, a packet report does not include a quick textual summary of the status of the designated packet within different phases.

In addition, under the headers 204 of FIG. 2, are details 206 concerning the designated packet within a particular phase identified by the header 204. For example, in the present embodiment, under the NAT Translation header 204, there are two details 206, which indicate that the designated packet has been network address translated via dynamic NAT Rule #10 and the source address of the designated packet has been changed to 192.1.1.20. Details 206 may be different for different phases of different designated packets. In some instances, the Packet Report 200 may not include details 206.

In further reference to FIG. 2, in present embodiment, there is a Go to rule button 208 corresponding to each phase of the designated packet progression. The Go to rule button 208, in present embodiment, is dynamically linked to the configuration information (also referred to as the configured rule) associated with a phase of the designated packet's progression within a network device. By selecting a particular Go to rule button 208, a user may access the configured rule (also referred to as first rule) which contributed to the outcome/result of the packet through the particular phase. For example, in present embodiment, if a user were to select Go to rule button 208 that corresponds to the network address translation phase (e.g., the Go to rule button 208 that is associated with NAT Translation header 204), the user would be able to directly access the dynamic NAT configured rule #10. In one embodiment, one or more Go to rule button 208 may be included in the exemplary Packet Report 200. In another embodiment, the Go to rule button 208 may be depicted with another name, or in another way. In yet another embodiment, the exemplary Packet Report 200 may not include a Go to rule button 208.

The Packet Report 200, as depicted in FIG. 2, also includes an Allow this traffic button 210. In present embodiment, this Allow this traffic button 210, if selected, generates a reverse rule (also referred to as second rule) to the configured rule, which contributed to the result of the particular phase. For example, in the present embodiment, if a user selects the Allow this traffic button 210, a rule opposite of the configured rule, which resulted in the designated packet being denied and/or dropped in the output access control phase, will be generated. This opposite rule will allow the designated packet to be allowed through the output access control phase. In one embodiment, one or more Allow this traffic button 210 may be included in the exemplary Packet Report 200. In another embodiment, the Allow this traffic button 210 may be depicted with another name, or in another way. In yet another embodiment, the exemplary Packet Report 200 may not include an Allow this traffic button 210. Furthermore, in another embodiment, a button for creating a rule opposite of the configured rule, when selected, may generate a rule which allows a packet that was allowed/permitted to be denied.

Figure 3:
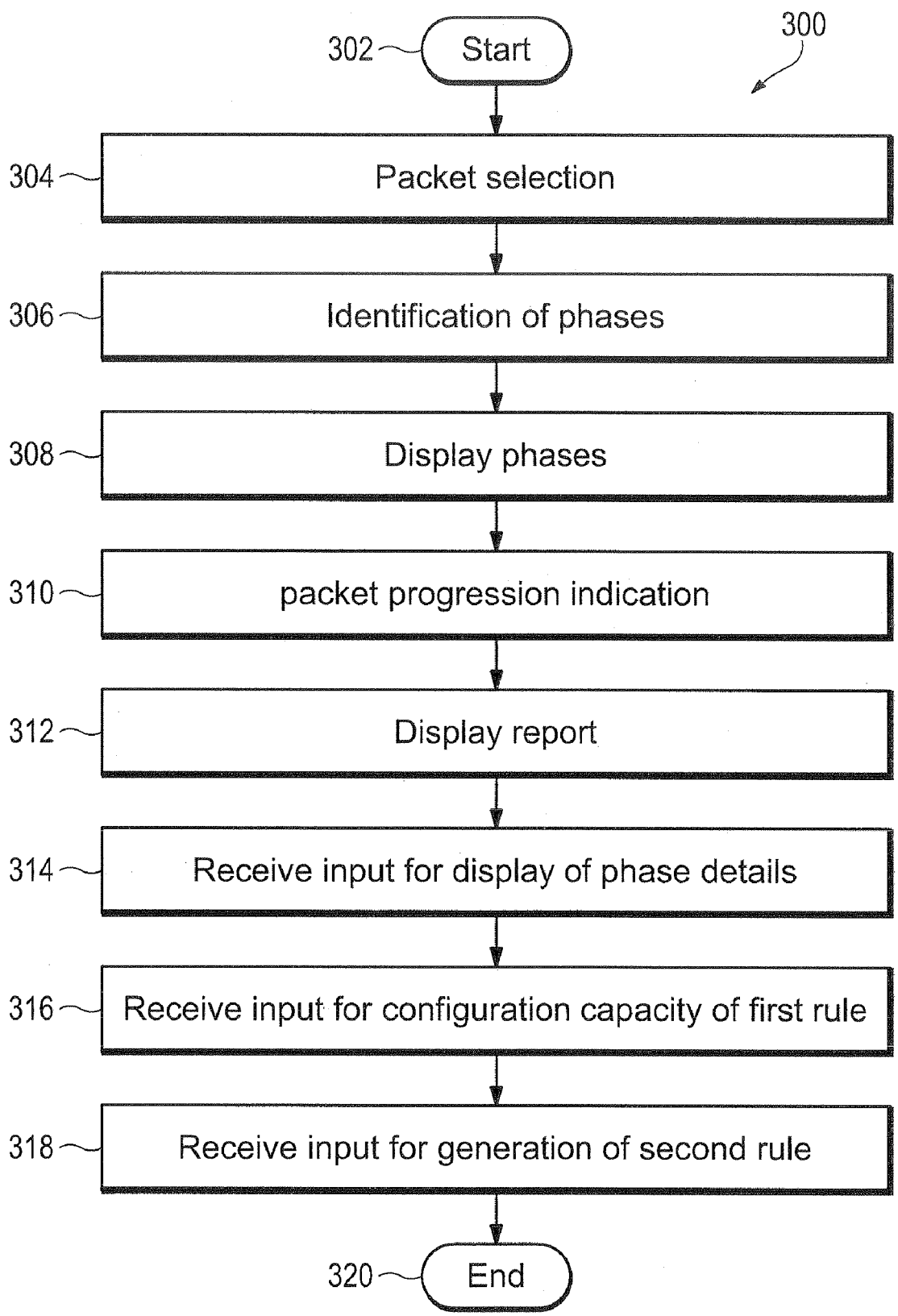
FIG. 3 illustrates a flowchart showing an exemplary method of graphically displaying a packet progression within a network device, according to an embodiment.

FIG. 3 illustrates a flowchart showing an exemplary method 300 of graphically displaying a packet progression within a network device, according to an embodiment. In one embodiment, method 300 is implemented by a processing device, such as a computer. Although specific steps are disclosed in flowchart 300, such steps are exemplary. That is, various embodiments are well suited to performing a variety of other additional steps or variations of the steps recited in flowchart 300. The steps in flowchart 300 may also be performed in an order different than presented. At block 302 of FIG. 3, the process starts.

At block 304 of FIG. 3, in present embodiment, a packet is selected by a user. A user can be an individual user, an individual user device, an enterprise, a service provider, or an application program. Also, there can be multiple numbers and/or types of users simultaneously. In one embodiment, a plurality of packet selections is received. Furthermore, a packet selected, for its progression within a network device to be graphically displayed, may be a simulated packet or an actual packet. In addition, graphical display of a packet progression may cover all of the layers of, or part of the layer(s) of the Open Systems Interconnection (OSI) model (e.g., Layer 1: Physical, Layer 2: Data Link, Layer 3: Network, Layer 4: Transport, Layer 5: Session, Layer 6: Presentation, and Layer 7: Application). A packet may be selected and/or designated by a variety of ways. In one embodiment, a packet is selected by input from a pcap file or from the Packet Capture feature that exists in ASA/PIX. In another embodiment, a packet is selected by input of its defining key attribute information into an interface. Key attribute information may include, but is not limited to, ingress interface information, source Internet Protocol address, destination Internet Protocol address, protocol used, source port information, destination port information, and/or a hex dump of a packet. In another embodiment, the packet progression interface includes a button for selection of a designated packet.

At block 306 of FIG. 3, in present embodiment, the individual phases of the designated packet are identified (or recognized) by a corresponding operation performed on the packet. In other words, a selected packet progression is divided into a series of phases, which each phase corresponding to an operation. An operation (also referred to as a procedure) corresponding to a phase may be either an action, such as a modification of a packet, or a decision identifying a phase, such as a decision made to allow, or to deny a packet's further progression within a network device. In addition, the number and types of phases for different packets may be different for each packet and the number of phases may differ based on the network device's configuration and its state. For example, in one embodiment, a selected packet progression may be divided into a routing phase, a network address translation phase, and an output access control phase. In another embodiment, a selected packet progression may be divided into an input access control phase, a classification phase, a virtual private network rules phase, a rate limiting phase, and an output access control phase.

At block 308 of FIG. 3, in the present embodiment, the various identified phases are displayed to a user as part of the selected packet progression/movement display. The display could include one or more icons and the icons may be displayed to one user, or a multiple number of users. In one embodiment, the icons are displayed with other textual information.

At block 310 of FIG. 3, in the present embodiment, the display of the selected packet progression is animated, thus the progression of the packet is indicated to a user (e.g., FIGS. 1A and 1B). Animation of the display of a selected packet progression may be illustrated in various ways. For example, in one embodiment, the interface display of a selected packet progression may include several icons depicting various phases, which change colors and/or shapes as the packet passes through the phases. In another embodiment, the interface display of a selected packet progression may include textual information along with the icons, which flash as the packet passes the corresponding phases. In yet another embodiment, the interface display of a selected packet is not animated and the various identified phases are shown to a user simultaneously.

At block 312 of FIG. 3, in the present embodiment, the display of the selected packet progression (also referred to as packet progression interface) includes showing a report of associated phases of a designated packet progression and the end result of the operation, such as whether the packet is allowed or denied. In one embodiment, the selected packet progression interface may first display to a user a graphical animated packet progression (e.g., FIGS. 1A and 1B) as part of a comprehensive packet progression report (e.g., FIG. 2). The packet progression report may also be short, brief, concise, and exclude less important details. In one embodiment, the additional textual details of phases (e.g. the components of the packet progression interface depicted by 204 through 210 of FIG. 2), are also animated. For example, in such an embodiment, the additional textual details of phases may be displayed sequentially. In another embodiment, the additional textual details of phases are not animated, while the graphical display portion of a selected packet progression is animated.

At block 314 of FIG. 3, in the present embodiment, details of a particular phase of the various phases of a selected packet progression, which may include additional details not provided by a short packet progression report, may be displayed when input requesting the details of a particular phase is received. In one embodiment, the input may be received in the form of a selection of a designated button. In another embodiment, the packet progression interface includes dynamically linked icons and/or textual buttons, which when selected, bring up details of particular selected phases. For example, referring to FIGS. 1A and 1B, in such an embodiment, the user may access additional details of a particular phase by selecting one of the graphical phase icons 110. In another embodiment, the packet progression interface does not include dynamically linked icons and/or textual buttons.

Referring back now to FIG. 3, at block 316, in the present embodiment, designated input by a user allows that user direct configuration capacity for a rule (also referred to as first rule) corresponding to a phase of a selected packet progression. For example, as depicted in FIG. 2, in one embodiment, the packet progression interface includes a dynamically linked "Go to rule" button 208, which may be selected by a user. By selecting a particular "Go to rule" button 208, a user may access the configured rule(s) which contributed to the outcome/result of the packet through the particular phase. In another embodiment, the packet progression interface does not include such a dynamically linked button.

In reference to FIG. 3, at block 318, in the present embodiment, input by a user allows a user option to generate rule(s) (also referred to as second rule) opposite of the rule corresponding to a phase of a selected packet progression. For example, as depicted in FIG. 2, in one embodiment, the packet progression interface includes an "Allow this traffic" button 210, which when selected will generate a reverse rule to the rule corresponding to a particular phase of a packet progression. In another embodiment, the "Allow this traffic" button 210 may be depicted with another name, or in another way. In yet another embodiment, a packet progression interface may not include such an option. Referring back now to FIG. 3, at block 320, the process ends.

Thus, by having a method of graphically displaying a packet progression within a network device, a user can identify the operations, phases and the end results of individual phases of a packet progression, without having to examine associated logs (syslogs) and/or debugs and correlate the logs/debugs back to the specific packet. In addition, by having the operations performed on a packet separated into well-defined user-understandable phases and by allowing a user to easily access configured rules and generate reverse rules associated with various phases, a user is able to obtain a concise view of a packet progression for simplification of troubleshooting or debugging of a network problem. Furthermore, by having an easily understood animated graphical scheme for representing the phases of a packet life and the end results each individual phase has had on the packet, there is reduced need for a user to go through what could possibly be hundreds of logging messages to try understand the various operations performed on a packet within a network device.

Figure 4:
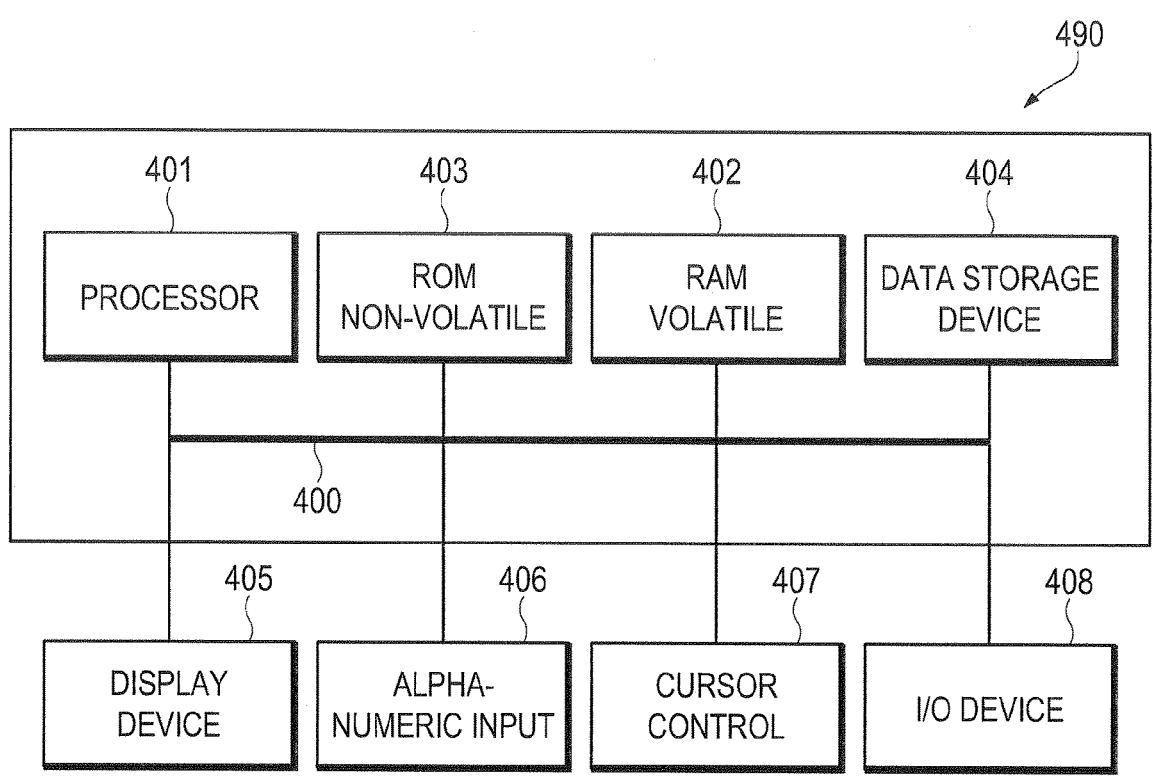
FIG. 4 illustrates an exemplary computer system upon which a computer-usable medium having computer-readable program code embodied therein for implementing a method for graphically displaying a packet movement within a network device may be practiced, upon which embodiments can be implemented.

FIG. 4 illustrates an exemplary computer system 490 upon which a computer-usable medium having computer-readable program code embodied therein for implementing a method for graphically displaying a packet movement within a network device may be practiced. In general, computer system 490 comprises bus 400 for recognizing a plurality of phases, processor 401 coupled with bus 400 for processing information and instructions, random access (volatile) memory (RAM) 402 coupled with bus 400 for storing information and instructions for processor 401, read-only (non-volatile) memory (ROM) 403 coupled with bus 400 for storing static information and instructions for processor 401, data storage device 404 such as a magnetic or optical disk and disk drive coupled with bus 400 for storing information and instructions, an optional user output device such as display device 405 coupled to bus 400 for displaying information, including the animated graphical display of a packet progression to the computer user. In addition, computer system 490 also comprises an optional user input device such as alphanumeric input device 406 including alphanumeric and function keys coupled to bus 400 for communicating information and command selections (e.g., input for allowing an automatic creation of second rule opposite of first rule associated with a phase of a packet progression) to processor 401, and an optional user input device such as cursor control device 407 coupled to bus 400 for communicating user input information and command selections to processor 401. Furthermore, an optional input/output (I/O) device 408 is used to couple computer system 490 onto, for example, a network.

Display device 405, which may be used for showing a packet progression interface, is utilized with computer system 490. Display device 405 may be a liquid crystal device, cathode ray tube, or other display device suitable for creating graphic images and alphanumeric characters recognizable to the user. Cursor control device 407 allows the computer user to dynamically signal the two-dimensional movement of a visible symbol (pointer) on a display screen of display device 405. Many implementations of the cursor control device are known in the art including a trackball, mouse, joystick or special keys on alphanumeric input device 406 capable of signaling movement of a given direction or manner of displacement. It is to be appreciated that the cursor control 407 also may be directed and/or activated via input from the keyboard using special keys and key sequence commands. Alternatively, the cursor may be directed and/or activated via input from a number of specially adapted cursor directing devices.

In the foregoing specification, embodiments have been described with reference to numerous specific details that may vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for graphically displaying a packet progression within a network device, said method comprising:
   identifying a plurality of phases that correspond to a plurality of operations performed on a packet as the packet progresses within the network device;
   displaying the plurality of phases on a display device;
   indicating, on the display device, progression of the packet through the plurality of phases and the corresponding plurality of operations performed on the packet during the progression, and wherein the display device indicates that the network device applied a first rule to the packet during at least one of the phases and dropped the packet based on the application of the first rule to the packet;
   and presenting, on the display device, a packet report for the packet that was dropped by the network device, wherein the packet report to textually identifies the phase the packet was dropped and include a first selectable button and a second selectable button both corresponding to the phase the packet was dropped and both associated with the first rule the network device implemented to drop the packet, wherein the first selectable button, when activated, prompts the display device to present a description of the first rule, wherein the second selectable button, when activated, directs the network device to automatically create a second rule opposite of the first rule, wherein the network device, applying the second rule, would not have dropped the packet in the phase associated with the dropped packet, and wherein the network device applies the second rule, instead of the first rule, to one or more future packets as the one or more future packets progress through the phase associated with the dropped packet.

2. The method as recited in claim 1 further comprising displaying a report for said packet to a user, wherein said report comprises said plurality of phases and a plurality of details associated with said phases.

3. The method as recited in claim 1 further comprising receiving an input for displaying details of a phase of said plurality of phases.

4. The method as recited in claim 1 further comprising receiving an input for allowing configuration capacity for the first rule associated with a phase of said plurality of phases.

5. The method as recited in claim 1 wherein said plurality of phases is graphically represented by a plurality of icons.

6. The method as recited in claim 1 wherein an operation of said plurality of operations corresponds to the first rule.

7. The method as recited in claim 1 wherein said progression of said packet through said plurality of phases is visually represented in an animated fashion.

8. A device comprising:
   a graphic display showing a plurality of phases corresponding to a plurality of operations performed on a packet within a network device, wherein a phase of said plurality of phases represents an operation of said plurality of operations associated with said packet, wherein progression of said packet is illustrated on the graphic display, wherein the graphic display indicates that the network device applied a first rule to the packet during at least one of the phases and dropped the packet based on the application of the first rule to the packet, wherein the graphic display presents a packet report for the packet that was dropped by the network device, which textually identifies the phase the packet was dropped and includes multiple input buttons corresponding to the phase the packet was dropped and associated with the first rule the network device implemented to drop the packet, wherein the network device receives an input from at least one of the input buttons that prompts the graphic display to present a description of the first rule, wherein the network device receives another input from at least one of the input buttons that directs the automatic creation of a second rule opposite of the first rule, wherein the network device, applying the second rule, would not have dropped the packet in the phase associated with the dropped packet, and wherein the network device applies the second rule, instead of the first rule, to one or more future packets as the one or more future packets progress through the phase associated with the dropped packet.

9. The device as recited in claim 8 further comprising a report for said packet, wherein said report comprises said plurality of phases and a plurality of details associated with said phases.

10. The device as recited in claim 8 further comprising a button for displaying details of a phase of said plurality of phases.

11. The device as recited in claim 8 further comprising a button for allowing configuration capacity for the first rule associated with a phase of said plurality of phases.

12. The device as recited in claim 8 further comprising a button for allowing the automatic creation of the second rule opposite of the first rule associated with a phase of said plurality of phases.

13. The device as recited in claim 8 wherein said plurality of phases is graphically represented by a plurality of icons.

14. The device as recited in claim 8 wherein said operation of said plurality of operations corresponds to the first rule.

15. The device as recited in claim 8 wherein said progression of said packet is illustrated in an animated mode.

16. A computer-usable memory having computer-readable program code embodied therein for graphically showing packet movement within a network device, comprising:

recognizing a plurality of phases, wherein a phase of said plurality of phases corresponds to a procedure of a plurality of procedures performed on said packet;

depicting said plurality of phases on a display device; and showing, on the display device, movement of said packet through said plurality of phases, wherein said plurality of procedures performed on said packet is visually represented, and wherein the display device indicates that the network device applied a first rule to the packet during at least one of the phases and dropped the packet based on the application of the first rule to the packet;

presenting, on the display device, a packet report for the packet that was dropped by the network device, wherein the packet report textually identifies the phase the packet was dropped and includes multiple input buttons corresponding to the phase the packet was dropped and the first rule the network device implemented to drop the packet;

receiving an input from at least one of the input buttons that prompts the display device to present a description of the first rule; and receiving another input from at least one of the input buttons that directs the network device to automatically create a second rule opposite of the first rule, wherein the network device, applying the second rule, would not have dropped the packet in the phase associated with the dropped packet, and wherein the network device applies the second rule, instead of the first rule, to one or more future packets as the one or more future packets progress through the phase associated with the dropped packet.

17. The computer-usable memory as recited in claim 16 further comprising showing a report for said packet to a user, wherein said report comprises said plurality of phases and a plurality of details associated with said phases.

18. The computer-usable memory as recited in claim 16 further comprising receiving an input for showing details of a phases of said plurality of phases.

19. The computer-usable memory as recited in claim 16 further comprising receiving an input for allowing configuration capacity for first rule associated with a phase of said plurality of phases.

20. The computer-usable memory as recited in claim 16 wherein said plurality of phases is graphically represented by a plurality of icons.

21. The computer-usable memory as recited in claim 16 wherein a procedure of said plurality of procedures corresponds to first rule.

22. The computer-usable memory as recited in claim 16 wherein said movement of said packet through said plurality of phases is visually represented in an animated fashion.

* * * * *